United States Patent [19]

Kantner et al.

[11] 4,347,700
[45] Sep. 7, 1982

[54] DIRECT-DRIVE HYDRAULIC PUMP-MOTOR

[75] Inventors: Harold H. Kantner, Evanston, Ill.; Stephen D. Scott, Cheyenne, Wyo.

[73] Assignee: Transcience Associates, Inc., Evanston, Ill.

[21] Appl. No.: 123,314

[22] Filed: Feb. 21, 1980

[51] Int. Cl.³ .................. F01C 1/08; F16H 39/06
[52] U.S. Cl. ........................ 60/325; 418/165; 280/216
[58] Field of Search .................. 60/325; 418/165; 280/216

[56] References Cited

U.S. PATENT DOCUMENTS

| | | | |
|---|---|---|---|
| 485,094 | 10/1892 | Dey et al. | 280/216 |
| 3,802,813 | 4/1974 | Butler | 418/165 |
| 4,249,750 | 2/1981 | Kantner | 418/165 X |

*Primary Examiner*—Irwin C. Cohen
*Attorney, Agent, or Firm*—Francis J. Bouda

[57] ABSTRACT

This invention resides in a closed system, with permanently fixed end plates, which permits the pump-motor of the present invention to operate either as a combined pump-motor, or as a pump only, or solely as a motor. Rotators of this invention have parallel axes normal to the end plates which they intersect at fixed coordinates. That makes possible direct drive to or from a rotator shaft extension or the enclosing cylindrical rotator.

In the device of this invention, the end-plates are nonrotary, but the cylindrical shell or housing always rotates. The plurality of rotators within the cylinder define a plurality of fluid pressure zones. Some of the rotators have a relatively smooth surface; the others have relatively gear-like surfaces. When the unit operates as a pump, a shaft extension of one of the rotators protrudes through one of the end plates and is coupled with an input power source such as the crank or pedals of a bicycle. When the unit is operated as a motor, a wheel, such as a bicycle wheel, or other motor unit can be attached to the rotary cylinder for propulsion of the vehicle to which the end-plates are affixed. The structure can be arranged with a plurality of high-pressure zones and a plurality of low-pressure zones in the pump-motor configuration to facilitate the combination of multiple units in various serial or parallel zone arrangements.

8 Claims, 11 Drawing Figures

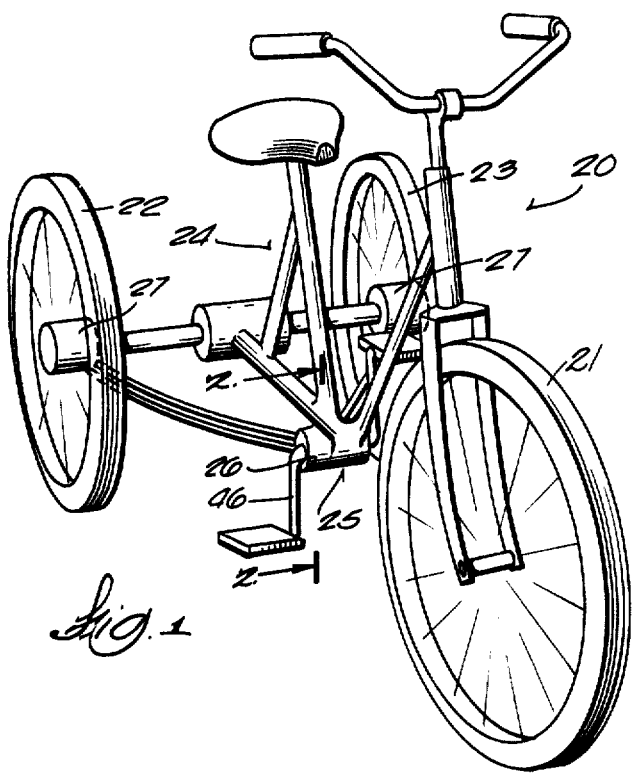
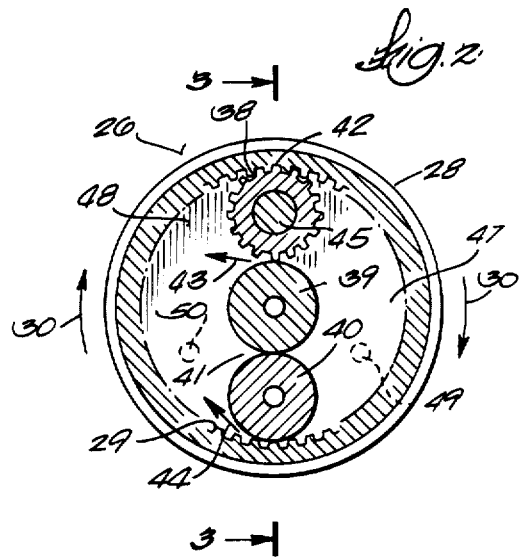
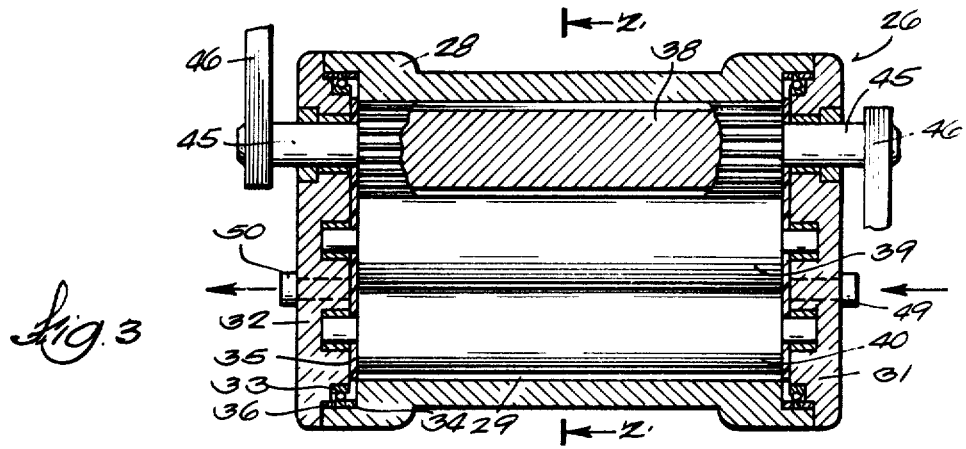
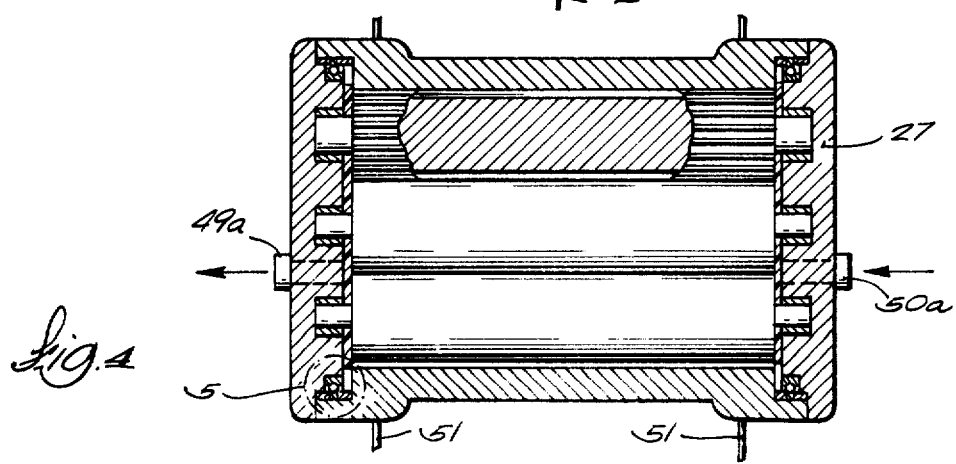

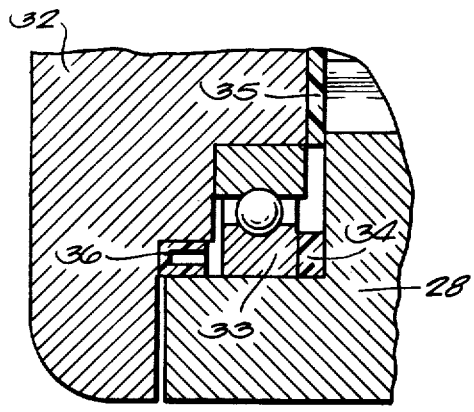
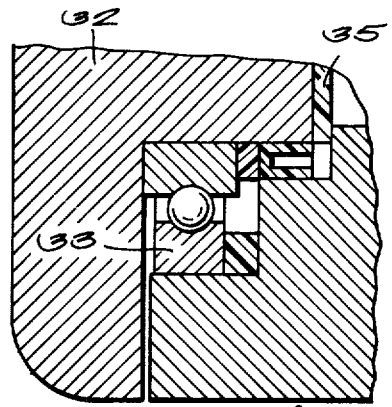
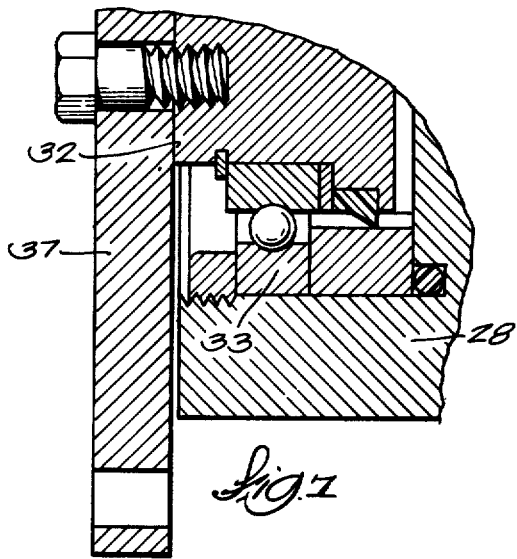
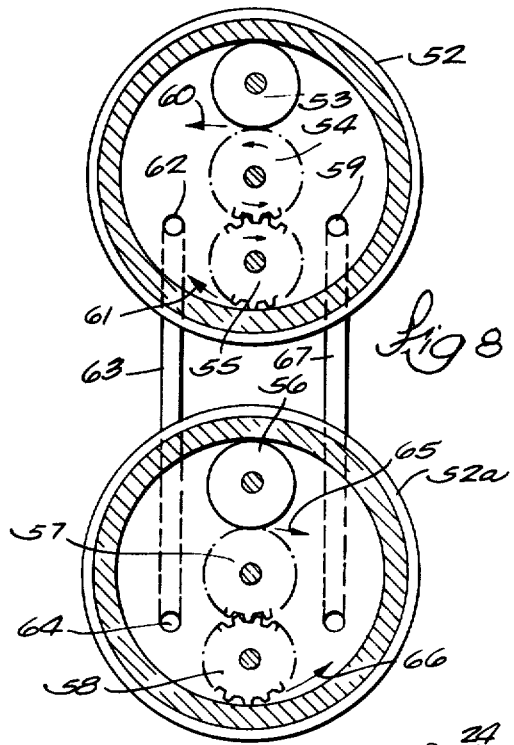
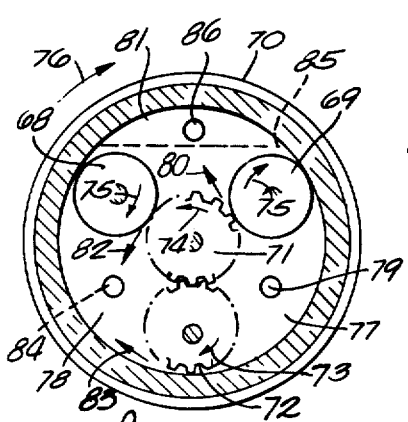
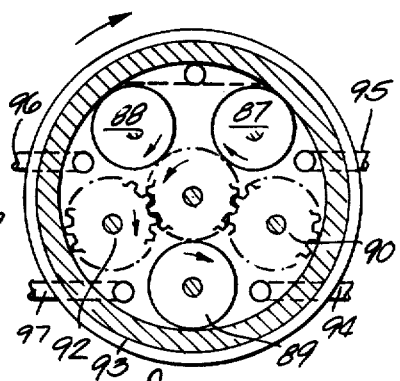
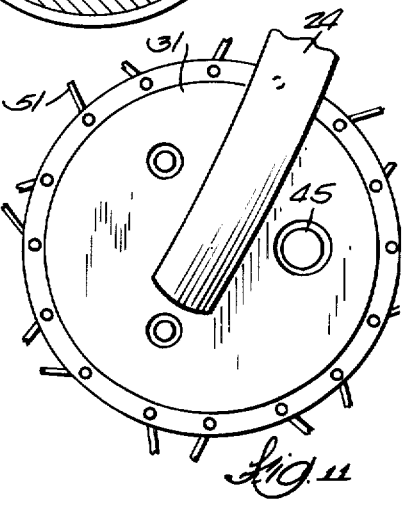

DIRECT-DRIVE HYDRAULIC PUMP-MOTOR

BACKGROUND OF THE INVENTION

The pump-motor is a fluid-power converter similar to that disclosed in U.S. patent application Ser. No. 13,844 filed Feb. 22, 1979 now U.S. Pat. No. 4,249,750, by one of the co-inventors of this application.

The basic structure of this invention is similar to that shown in FIG. 8 of the aforementioned pending patent application. Such basic structure is shown as a portion of FIG. 2 of the present application.

DESCRIPTION OF THE INVENTION

In this invention, we employ the concept of a fluid-power converter, utilizing rotary elements with rolling seals and displacement paths, similar to that shown in the co-pending application, Ser. No. 13,844. However, in this case, the system is a direct-drive closed system as hereinafter described.

Hydraulic circuits often incorporate a reservoir or tank open to atmospheric pressure. The function of such a sump is to re-supply pumps with fluid returned from actuators through a most economical buffered pressure zone. Closed hydraulic systems wherein the return lines are re-connected directly to pumps for input are less easily filled with fluid and may suffer thermal problems. Vehicles like wheelchairs or bicycles are operated, generally, with known orientation to the gravitational field, but they may be placed sideways or inverted during disuse, transport, or storage. Hydraulic transmissions should be designed to incorporate an air-capped sealed sump when intended for such service.

Furthermore, the direct-drive, hydraulic pump-motor of the present invention can have the following characteristics:

1. Where the pump and motor are combined, the end plates of the unit are permanently affixed to a support and in this case,
   (a) the outer housing can be turned by a driving shaft, or
   (b) the shaft can be turned by rotating the outer housing.
   In either situation, accessories can be driven with a shaft or housing while simultaneously pumping fluid to a motor.
2. In the instance where the unit is operated only as a pump and the end plates are permanently affixed to a support,
   (a) fluid can be pumped through the unit by turning the driving shaft and no accessories need be attached to the outer housing.
   Where the end plates are permanently affixed to a support and no input shaft is provided,
   (b) fluid can be pumped through the unit by rotating the outer housing.
3. When the unit is operated only as a motor and with the end plates permanently affixed to a support,
   (a) fluid which is pumped into the housing rotates the shaft and the outer housing simultaneously and permits attachment of accessories to shaft and housing.
   Where the end plates are permanently affixed to a support and there is no external shaft,
   (b) fluid which is pumped into the chamber rotates the outer housing, and this is ideal for use as the hub of a wheel with spokes attached to the outer housing.

As can be appreciated, in the present invention it is not necessary that the end plates of the unit rotate and thus the permanently affixed end plates contribute to simplicity of construction. Since the pinion axis is fixed with respect to the end plates, transfer of its rotation to the housing axis is a trivial mechanical coupling. Furthermore, this system can operate with a shaft extension as a mechanohydraulic component of a three-wheel-drive system to run all wheels of the tricycle gear. Any prime mover (such as the human pedal effort on a tricycle crank or a motor), would operate the shaft of a combined pump-motor coupled to its wheel for direct transmission of power by mechanical means, and fluid pumped through it simultaneously would be used to drive hydraulic motors in the other two wheels. It will also be appreciated that the power input shaft does not have to be concentric with the cylinder of the device and can be operated quite normally and without difficulty in a fixed position offset from the center of the unit.

With the preceding discussion in mind, one object of the present invention is to provide a fluid-power converter or pump motor, particularly adapted for bicycle transmission and tri-cycle transmission.

Another object of the present invention is to provide a direct-drive hydraulic pump-motor.

Another object of the present invention is to provide a pump and motor drive-system which is a closed hydraulic circuit.

A further object of the present invention is to provide a fluid-power converter with rolling seals and displacement paths wherein the end plates of the unit do not rotate and can be permanently affixed to a support.

With the above and other objects in view, a clearer understanding of the present invention may be obtained by referring to the following detailed description.

DETAILED DESCRIPTION

For the purpose of illustrating the invention, there is shown in the accompanying drawings, forms thereof which are presently preferred, although it is to be understood that the various instrumentalities of which the invention consists can be variously arranged and organized, and that the invention is not limited to the precise arrangements and organizations of the instrumentalities as herein shown and described.

In the drawings, wherein like reference characters indicate like parts:

FIG. 1 represents a perspective view of an adult tricycle utilizing one pump and two motors of the present invention.

FIG. 2 represents a vertical cross-sectional view taken through the pump-unit along lines 2—2 of FIG. 1 and FIG. 3.

FIG. 3 represents a longitudinal cross-sectional view taken generally along line 3—3 of FIG. 2.

FIG. 4 is a longitudinal cross-sectional view, similar to that shown in FIG. 3, but representing the cross section of the motor-unit which is employed in the rear wheels of the tricycle shown in FIG. 1.

FIG. 5 is a fragmentary cross-sectional view of the sealing-mechanism shown at 5 in FIG. 4.

FIG. 6 is a fragmentary cross-sectional view of an alternate form of sealing-mechanism.

FIG. 7 is a fragmentary cross-sectional view of the end plate sealing-mechanism and flange-ring support for the end plates for mounting the pump-unit and the rear-wheel motor units of the tricycle shown in FIG. 1.

FIG. 8 is a schematic diagrammatic view showing the pump unit similar to that shown in FIG. 3 and a motor-unit similar to that shown in FIG. 4 inter-connected to provide the drive mechanism incorporated in the tricycle shown in FIG. 1.

FIG. 9 is a vertical cross-sectional view of a preferred embodiment of the pump-motor of the present invention, illustrating a configuration which provides a fluid-sump and filler plug.

FIG. 10 is still another embodiment of the present invention, similar to FIG. 9, which shows a configuration with additional rotators to provide two separate fluid-channels or conduits. This dual pump-motor is a preferred embodiment which would be used in variable speed fluid drive systems controllable by serial/parallel flow proportionation.

FIG. 11 is a fragmentary elevational view showing how the pump-unit of the present invention illustrated in FIG. 3 can be mounted in the support of a bicycle, with an off-center crank shaft supported in the non-rotatable end plates.

Referring now to FIG. 1, we have illustrated a tricycle 20 which is a front wheel 21 and rear wheels 22 and 23 appropriately supported in a frame 24.

In the crank portion 25 of the frame 24, we have mounted the pump-unit of the present invention, similar to that unit 26 illustrated in FIGS. 2 and 3.

Similarly, in the hubs of the rear wheels 22 and 23, we have mounted a motor-unit 27, similar to that shown in FIG. 4.

The pump-unit 26 may be mounted in a manner illustrated in FIG. 11 (hereafter to be described), and with a flange ring similar to that shown in FIG. 7 (hereinafter to be described).

The principle of the operation is as follows:

Referring now to FIG. 2 (which is similar to the arrangement illustrated in FIG. 3 of co-pending application, Ser. No. 13,844), we have illustrated a cylinder 28 with internal gears 29. This cylinder is free to rotate as indicated by the arrows 30.

The cylinder 28 is supported in end plates 31 and 32, as shown in FIG. 3, with appropriate bearings 33, spacer 34, facing plate 35, and radial seal 36, separating the end plate 32 and the cylinder 28, as shown in FIG. 5.

An alternate form of support and seal is shown in FIG. 6.

Thus it can be seen that the cylinder 28 is free to rotate about the end plates 31 and 32 when those plates are fixed to a support.

We have illustrated in FIG. 7 the use of a flange ring 37, which can be bolted to an end plate 32 to support the end plate for non-rotational disposition while yet permitting the cylinder 28 to rotate.

In FIG. 7, we have also illustrated an alternate form of gasket and bearing assembly to support and seal the space between the end plate and the cylinder.

Referring once again to FIGS. 2, and 3, it can be seen that we have provided a plurality of rotators within the cylinder 28, one of which is a gear 38, which meshes with the gear 29 of the cylinder. The other two rotators are the smooth-surfaced rotator 39 and its mate, 40. The rotator 39 is in contact with the tips of the teeth of the gear 38 and with the surface of the rotator 40, while the surface of the rotator 40 is also in contact with the tips of the teeth 29 in the cylinder 28. This arrangement provides a rolling seal 41 between the rotators 39 and 40 and a rolling seal 42 between the gears 29 and 38.

In addition, the rotating contact between the gear 38 and the rotator 39 provide a displacement path 43 shown by the arrow and a second displacement path 44, shown by the arrow between the rotator 40 and the gear 29.

The rotators 38, 39 and 40 are mounted in the end plates 31 and 32, by suitable shafts, and thus, when any of the rotators is revolved (as, for example, the rotator 38 coupled to the shaft 45 can be rotated by an external crank 46 attached to the shaft), all three rotators revolve as shown by the arrows, and a cylinder rotates as well in the direction of the arrow 30, and any fluid contained within the low-pressure chamber 47, is transferred to the high pressure chamber 48 through the displacement paths 43 and 44.

We have provided an inlet port 49 to bring fluid to the low pressure chamber 47, and an outlet port 50 through which the fluid in the high pressure chamber 48 may be conveyed through an appropriate conduit.

The motor-unit illustrated in FIG. 4 is similar to the pump unit illustrated in FIG. 3, except that the input power shaft is not connected to the gear rotator 38 and, on the other hand, external surface of the cylinder 26 has a power takeoff unit (for instance, the spokes 51 of a bicycle wheel) attached thereto so as to transmit the rotary motion of the cylinder to a usable force.

The motor-unit is driven by the high-pressure fluid which enters through the conduit 50a, and then is forced through the displacement paths, similar to the paths 43 and 44, into the low pressure outlet 49-a, where it can return to the low pressure inlet side 49 of the pump-unit.

Referring now to FIG. 8, we illustrate a pair of the pumps and motors of the present invention, similar to that described, but as can be seen in the upper unit of FIG. 8, the pump is constructed of a smooth-surfaced inner-walled cylinder 52, with a single, smooth-surface rotator 53 and two gear-rotators 54 and 55.

Similarly, the motor-unit in the lower portion of FIG. 8 also includes a smooth-walled cylinder 52-a with a smooth surfaced rotator 56 and two gear-like rotators 57 and 58.

In principle, the operation of the units shown in FIG. 8 is identical to that shown in FIGS. 2, 3, and 4, except that the construction is much more simplified by utilization of a smooth-walled cylinder rather than the cylinder having a gear-like inner surface.

The fluid flows from the low pressure chamber 59 through displacement paths 60 and 61 and out the high pressure outlet 62 through the conduit 63 into the high pressure inlet 64 of the motor-unit, through the displacement paths 65 and 66 and out the low pressure conduit 67 back into the low pressure chamber of the pump-unit.

Thus by rotating either the gear 54 or 55 of the pum-punit, the outer cylinder 52-a of the motor-unit will rotate, and if this cylinder is attached to the hub of a bicycle wheel, the bicycle will be driven when the crank attached to the gear of the pump unit is rotated.

In FIG. 11 we have illustrated a mounting configuration wherein an end plate 31 has a shaft 45 extending through the end plate and, quite obviously, this shaft need not be concentric with the cylinder of the end plate. In this configuration, the fluid inlet and fluid outlet ports can be fixed in the same end plate (in juxtaposition with the respective high pressure and low pressure zones within the unit) or, as is illustrated in FIGS. 3 and 4, the inlet can be in one end plate and the outlet can be in the other end plate of the pump-unit. The frame 24 and the spokes 51 also illustrate how this end plate can be mounted in the rear wheel hub mounting mechanism, and in this case the shaft 45 would not extend through the end plate.

In FIG. 9, I show a preferred embodiment of the construction of the pump and/or motor unit, utilizing two smooth-surfaced rotators and two gear-surface rotators within a smooth-walled cylinder. In this embodiment, smooth-surfaced rotators 68 and 69 are mounted in contact with a smooth inner-wall of the cylinder 70, and both the rotator 68 and 69 are mounted in operative contact with the tips of the teeth of the tooth-like rotator 71. A second gear-like rotator 72 is mounted in meshing connection with the gear-like rotator 71 and also has the tips of its teeth in contact with the smooth inner wall of the cylinder 70.

When the gear 72 is rotated in the direction of the arrow 73, the gear 71 rotates counter-clockwise as shown by the arrow 74, and the smooth-surface rotators rotate in a clockwise direction as shown by the arrows 75. This also causes the cylinder to rotate in the clockwise direction as shown by the arrow 76.

The configuration provides a low-pressure chamber 77 and a high pressure chamber 78.

Fluid is brought into the low-pressure chamber 77 through an inlet port 79 from where it is forced through the displacement path 80 into the sump 81. It passes out of the sump 81 through the displacement path 82 into the high pressure chamber 78.

Similarly, the fluid is forced through the displacement path 83 into the high pressure chamber 78. From the high pressure chamber it is forced out through the outlet port 84 to provide the circuit as previously described.

It can be seen that the fluid need not completely fill the interior of the cylinder 70, but may rise to a level 85, and as long as the unit is in the orientation shown in FIG. 9, the pump and motor system operates effectively with the gravitational force keeping the unit completely filled with liquid.

This configuration permits easy filling of the fluid into the system through the filler plug 86.

Moreover, it is not material whether the tricycle is displaced from the horizontal or turned upside down for carrying or storage, etc. Once it is placed in its upright position and the gravitational force brings the fluid within the cylinder to the level shown at 85, the system will operate as heretofore described.

In FIG. 10, we have illustrated an embodiment similar to that shown in FIG. 9, but with still two more rotators added within the cylinder. This arrangement provides the smooth rotators 87, 88 and 89 and the gear-like rotators 90, 91 and 92 all rotating within the smooth inner-walled surface of the cylinder 93.

As can be seen by the respective arrows, the displacement paths are created between the contact lines of the smooth walled cylinders and the gear-like rotators, and in this configuration a pair of circuits illustrated by the high pressure line 94 and low pressure line 95 and, similarly, by the high pressure line 96 and low pressure line 97, create two separate circuits but with equal displacement.

All of the embodiments heretofore described are within the scope of the closed circuit or closed system invention, but it is to be understood that multiples of rotators can be added to a cylinder, similar to that shown in FIG. 10, wherein still additional fluid circuits can be identified while still utilizing the sump-like filler-like system described in respect to FIGS. 9 and 10.

It should be pointed out that as the fluid is displaced from a low-pressure chamber via two paths into a high-pressure chamber, that half the fluid passes directly from the low-pressure chamber to a high-pressure chamber, while the other half of the fluid travels from the low-pressure chamber to the high-pressure chamber via the sump where it undergoes reservoir mixing at an intermediate buffer pressure. Depending upon whether or not the filler plug is fitted with a flexible diaphragm or a breather orifice, the sump chamber may be at atmospheric pressure, or it may be pressurized positively or negatively from atmospheric pressure.

Half of the fluid passes by each displacement path because the gears have equal radii and angular rates and thus transport the fluid by tooth-pocketed displacement at the same rate.

The overhead sump which has been described retains its configuration and effect when the fluid-power converter is driven hydraulically instead of mechanically to operate as a motor instead of as a pump.

It is to be understood that the present invention may be embodied in other specific forms without departing from the spirit or special attributes thereof, and it is, therefore, desired that the present embodiment be considered in all respects as illustrative and not restrictive, reference being made to the appended claims rather than to the foregoing description, to indicate the scope of the invention.

Having thus described our invention, what we claim as new and desire to protect by Letters Patent are the following:

1. In a fluid-power converter which is a pump-motor,
   a housing which coprises a rotatable cylinder and a pair of non-rotatable end plates defining a chamber, means interposed between said rotatable cylinder and end plates permitting relative rotation therebetween,
   a quantity of fluid within the chamber
   at least four rotators within the cylinder and supported by the end plates,
   said rotators being in contact whereby to define a plurality of pressure areas in the chamber, a plurality of said rotators engaging said rotatable cylinder,
   at least one of said areas being a high-pressure area,
   at least one of said areas being a low-pressure area,
   at least one of said rotators having a smooth surface,
   at least one of said rotators having a gear-like surface,
   a smooth rotator and a gear-like rotator being in rolling contact with each other to define a displacement path therebetween whereby said fluid may be transferred from one pressure area to another pressure area,
   at least one pair of similar rotators in contact with each other to provide a rolling seal between them whereby to restrict to the displacement path any fluid flow between the said areas,
   a fluid-port for the low-pressure area,
   a fluid-port for the high-pressure area, and
   a fluid-sump defined by rotators and said rotatable cylinder, said sump being in communication with the high pressure area and the low pressure area via displacement paths.

2. A plurality of pump-motors according to claim 1, one of said units being a pump and the other being a motor,
- a fluid-conduit inter-connecting the high pressure area of the pump and the high-pressure area of the motor,
- and a fluid-conduit inter-connecting the low-pressure area of the pump and the low-pressure area of the motor.

3. The pump-motors of claim 2 wherein a power-drive shaft is operatively connected to one of the rotators of the pump-unit through a fixed end plate and wherein a power-take-off mechanism is operatively connected to the rotatable cylinder of the motor-unit.

4. The pump-motor of claim 1 including
- two gear-like rotators and two smooth rotators,
- said cylinder having a smooth inner wall,
- one low-pressure area
- one high-pressure area
- one displacement path between a low-pressure area and a high-pressure area,
- one displacement path between the low-pressure area and the sump, and
- one displacement path between the sump and a high-pressure area.

5. The pump-motor of claim 1 including,
- three gear-like rotators,
- three smooth-surface rotators,
- two low-pressure areas, each with an associated low-pressure port,
- two high-pressure areas, each with an associated high-pressure port,
- a conduit connecting one high-pressure port and one low-pressure port,
- a second conduit connecting another high-pressure port and another low-pressure port,
- five displacement paths, three of which directly connect high and low-pressure areas,
- and two displacement paths which are connected to the said sump.

6. The plurality of pump-motors of claim 2 wherein a shaft is a power-take-off mechanism operatively connected to one of the rotators of the motor-unit through a fixed end plate and wherein a power-drive mechanism is operatively connected to the rotatable cylinder of the pump-unit.

7. The plurality of pump-motors of claim 2, at least one of which includes
- two gear-like rotators and two smooth rotators,
- said cylinder having a smooth inner wall,
- one low-pressure area,
- one high-pressure area,
- one displacement path between a low-pressure area and a high-pressure area,
- one displacement path between the low-pressure area and the sump, and
- one displacement path between the sump and a high-pressure area.

8. The plurality of pump-motors of claim 2, at least one of which includes
- three gear-like rotators,
- three smooth-surface rotators,
- two low-pressure areas, each with an associated low-pressure port,
- two high-pressure areas, each with an associated high-pressure port,
- a conduit connecting one high-pressure port and one low-pressure port,
- a second conduit connecting another high-pressure port and another low-pressure port,
- five displacement paths, three of which directly connect high and low-pressure areas,
- and two displacement paths which are connected to the said sump.

* * * * *